April 21, 1942.  H. G. HUGHEY ET AL  2,280,151

FLAME MACHINING

Filed May 3, 1940   2 Sheets-Sheet 1

INVENTORS
Howard S. Hughey and
Walter G. Sylvester
BY
ATTORNEY

April 21, 1942. H. G. HUGHEY ET AL 2,280,151
FLAME MACHINING
Filed May 3, 1940 2 Sheets-Sheet 2

INVENTORS
Howard G. Hughey and
Walter S. Sylvester
BY
ATTORNEY

Patented Apr. 21, 1942

2,280,151

UNITED STATES PATENT OFFICE 2,280,151

FLAME MACHINING

Howard G. Hughey, Bloomfield, and Walter G. Sylvester, Jersey City, N. J., assignors to Air Reduction Company, Incorporated, New York, N. Y., a corporation of New York Application May 3, 1940, Serial No. 333,078

12 Claims. (Cl. 148—9)

This invention relates to the removal of metal from a steel plate, or other work-piece, to shape the edge of the plate to a desired contour. Such operations are known as "flame machining" and they possess important advantages in speed and economy as compared with tool machining when the shape to be formed is simple and a flame cut surface is sufficiently smooth.

It is an object of this invention to provide an improved method of flame machining. A more specific object of the invention is to provide an improved method for preparing the edges of a metal work-piece for electric welding. The edge form produced by this invention includes a sloping plane surface that extends outward toward the bottom and that meets, in a substantially tangential relation, a cylindrical surface that curves outward to an approximately right-angular corner with a land or vertical plane face of limited height at the bottom of the plate edge.

When flame machining a metal edge by the process of this invention, any angle of bevel for the sloping face can be combined with any radius of curvature for the cylindrical portion of the surface. The invention, therefore, obtains a wide variety of edge forms suitable for different thicknesses of the plate or other work-piece, and for different welding techniques.

In accordance with one feature of the invention a metal edge is given similar treatment from both above and below when the edge is to be formed with a land between the top and bottom edges.

Another object of the invention is to provide a more economical method for preparing plate edges for electric welding. This result is attained by removing a portion of the metal as solid metal in contrast with earlier flame machining processes that required reaction of oxygen with all of the metal to be removed in producing edges with contours comparable to those obtained with this invention.

Other objects, features and advantages of the invention will appear or be pointed out as the specification proceeds.

In the accompanying drawings, forming part hereof:

Figure 1:
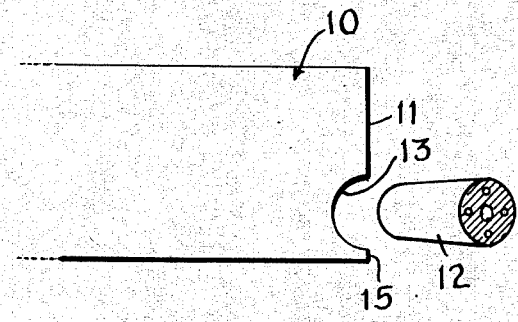
Fig. 1 is an end view of a plate showing the initial grooving step of this invention.

A steel plate 10, which is representative of workpieces, has an edge face 11. The edge face is normal to the top and bottom surfaces of the plate shown in the drawings, but the invention is not limited to such edges and can be used on sloping edge faces.

The first step of the process of this invention is a grooving operation performed with a scarfing torch 12 that is directed at an acute angle to the edge face of the plate and moved lengthwise along the edge to produce a substantially semicircular groove 13. The scarfing torch is preferably equipped with preheating flames for bringing the metal to a kindling temperature progressively along the surface of the plate in a manner well understood in the art.

The lower edge of the groove 13 is a short distance above the bottom of the plate 10 so as to leave a land 15 along the lower part of the plate edge. The height of the land 15 can be varied by moving the scarfing torch 12 up or down in Fig. 1.

Figure 2:
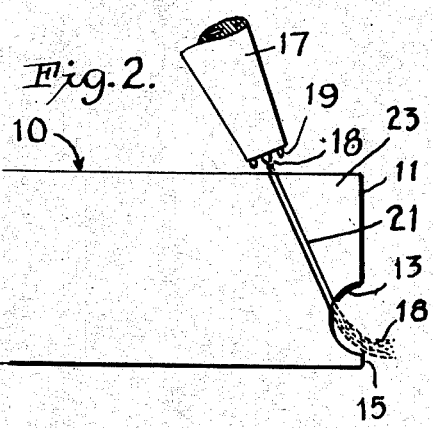
Fig. 2 is an end view of the plate shown in Fig. 1 during the subsequent cutting step of the invention.

The second step of the method is shown in Fig. 2 and is a cutting operation performed with a torch 17 that directs a cutting jet 18 against the top surface of the plate 10 at the desired angle to the top and bottom surfaces of the plate. The torch 17 has preheating flame jets 19 around the cutting jet.

The torch 17 is preferably adjusted to cut a kerf 21 that is substantially tangent to the curved surface of the groove 13, but a little inside of the tangent position. If the lower wall of the sloping kerf 21 is exactly tangent to the curved surface of the groove 13, the molten products produced by the cutting operation do not always discharge completely and the kerf sometimes becomes clogged at the bottom so that the cut is lost. By having the kerf 21 substantially tangent to the curved surface of the groove 13, but actually intersecting that surface across the full width of the kerf, the cut proceeds without clogging, most of the products of the cutting operation are blown across the lower surface of the groove 13, and any slag that does adhere to the groove surface is easily cleaned off.

The torch 17 is moved progressively along the top surface of the plate 10. The grooving and cutting can be performed at different times, but these steps are preferably performed simultaneously on different portions of the plate as shown in Fig. 3.

Figure 3:
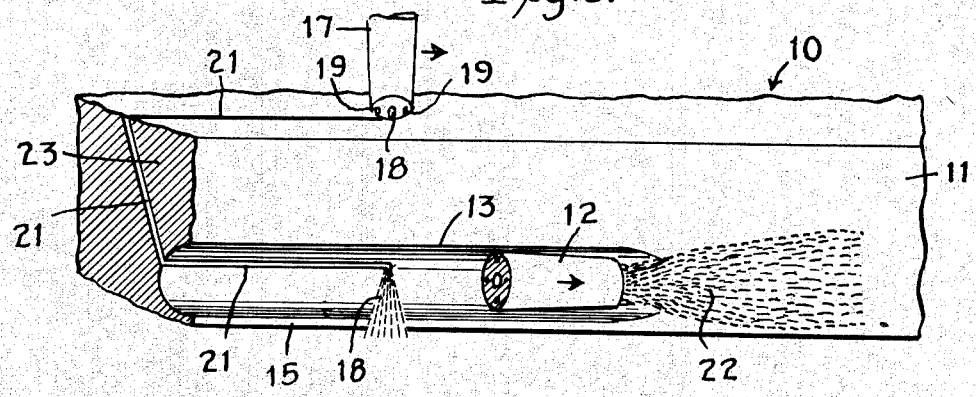
Fig. 3 is a side elevation of the plate showing the manner in which the operations illustrated in Figs. 1 and 2 are performed simultaneously on different portions of the edge face of the plate.

The scarfing torch 12 directs an oxygen jet 22 against the plate edge as the torch 12 is moved to the right as indicated by the arrow ahead of the torch in Fig. 3. This oxygen jet 22 is preferably a low velocity scarfing jet but high velocity jets (i. e., above 1000 ft. per minute) can be used. A short distance behind the scarfing torch 12, the cutting torch 17 directs the high velocity oxygen jet 18 against the top of the plate at an angle to the surface, as already explained in connection with Fig. 2. The simultaneous grooving and cutting not only saves time by performing the entire flame machining process in one operation, but the cutting jet works on metal that is still warm from the scarfing and such heat facilitates the cutting. The relative movement of the torches and plate can, of course, be obtained by moving the plate.

It will be apparent from Fig. 2 that this invention is not limited to any particular angle for the bevel face. No matter what angle is chosen for the sloping face that is produced by the cutting torch 17, it is possible to adjust the torch 17 toward or from the plate edge so as to bring the plane of the cut to a location substantially tangent with the groove surface.

Figure 4:
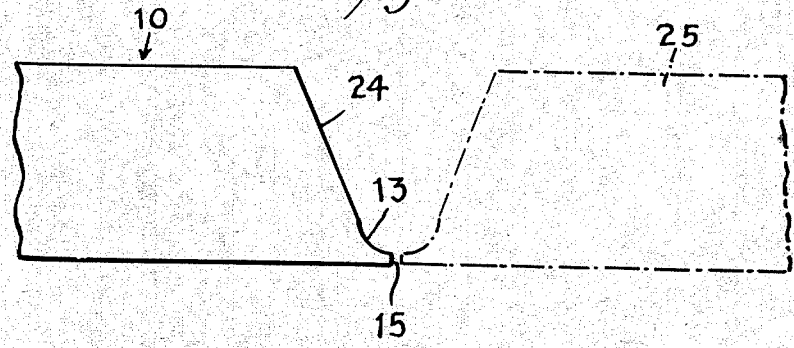
Fig. 4 is an end view of the finished edge made by the steps shown in Figs. 1–3 with a similar complementary edge shown in position for welding.

When the cut 21 is finished along the full length of the plate 10, the upper corner portion 23 of the plate is completely severed from the remainder of the plate. The final edge contour is shown in Fig. 4. The sloping or bevel face is indicated by the reference character 24. The shape of the trough resulting from such an edge contour is also shown in Fig. 4, which illustrates in dotted lines a second plate 25, with an edge similar to that of the plate 10, in position to be welded to the plate 10.

It is an important feature of the invention that the upper corner portion 23 (Fig. 2) is removed as a solid piece. This effects a substantial saving in oxygen in contrast with flame machining operations in which by successive passes, or in other ways, the entire mass of metal removed from the plate edge is removed as a liquid through the chemical and thermal action of the oxygen.

Figure 5:
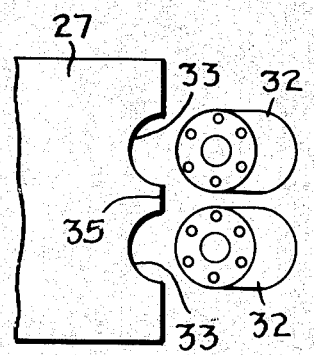
Fig. 5 illustrates the first step of a modified form of the invention in which two grooves are formed simultaneously on opposite sides of the center of the edge face.
Figure 6:
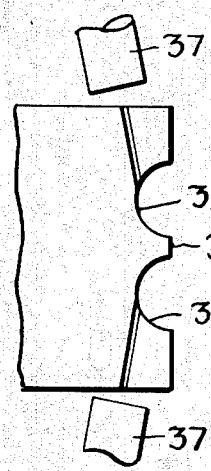
Fig. 6 illustrates the second step of the method shown in Fig. 5.
Figure 7:
Fig. 7 shows the edge form after the cutting step illustrated by Fig. 6.

Figs. 5–7 illustrate a modified form of the invention by which the edge of the work-piece 27 is formed with a land at the middle instead of at the lower end. Two scarfing torches 32 are operated simultaneously to produce parallel semicircular grooves 33. The unscarfed strip of original surface metal between the grooves 33 comprises a land 35 which may be made any desired width by merely controlling the spacing of the scarfing torches 32 with respect to one another.

The corner portions of the work-piece are cut off both above and below the grooves 33 by cutting torches 37 that direct cutting jets against the top and bottom surfaces in planes that are substantially tangent to the cylindrical surfaces of the adjacent groove 33. The final edge produced by the operations illustrated in Figs. 5 and 6 is shown in Fig. 7. The angle of bevel in Fig. 7 is ten degrees.

Figure 8:
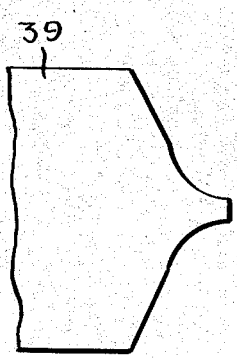
Fig. 8 shows an edge form similar to Fig. 7 but made with the cutting jets disposed at greater angles to the vertical.

Fig. 8 shows a work-piece 39 with an edge shaped by the same process as used for forming the edge shown in Fig. 7, but with the cutting jets directed at an angle of 25 degrees to the vertical. This greater angle of bevel is made with the plane of the cut substantially tangent to the surface of the groove 33 just as with the steeper angles of bevel shown in Figs. 4 and 7.

Figure 9:
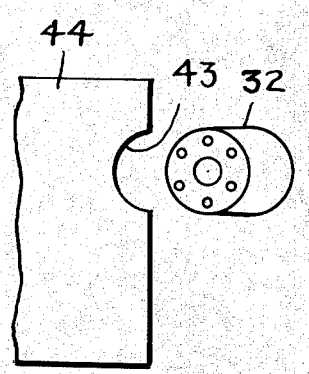
Figs. 9–12 are views corresponding to Figs. 5–8 but showing the operation performed on only the upper portion of the edge.

Instead of making both of the grooves 33 simultaneously, the upper scarfing torch 32 can be used to make a single groove 43 in a work-piece 44, as shown in Fig. 9. The groove 43 is made above the center line of the work-piece by a distance equal to one-half the height of the desired land which will correspond to the land 35 of Figs. 5–7.

Figure 10:
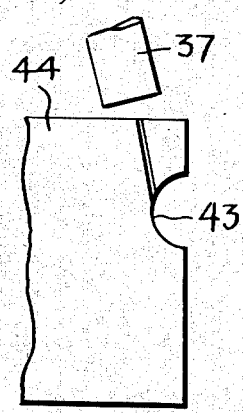
Figure 11:
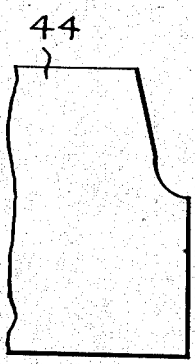
Figure 12:
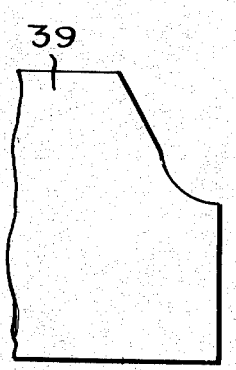

The upper edge portion of the work-piece 44 is then cut off with the torch 37, as illustrated in Fig. 10, to produce the edge form shown in Fig. 11, or the cutting torch can be directed at a larger angle of inclination to the vertical to produce the edge form shown in Fig. 12. The operations illustrated in Figs. 9 and 10 can then be repeated on the other side of the center line of the plate to produce the edge forms shown in Figs. 7 and 8.

The preferred embodiment and some modifications of the invention have been described. When the edge is bevelled both above and below the land it is not necessary that the land be centrally located, however, and other changes and modifications can be made. Terms of orientation in the description and claims are, of course, relative, and some features of the invention can be used without others.

We claim:

1. A method of preparing an edge of a metal plate for welding, which method comprises producing a groove in the edge face of the plate by means of an oxygen scarfing jet applied to metal at ignition temperature and moved progressively along the edge face of the plate, and subsequently cutting off that portion of the plate edge above the groove with an oxygen cutting jet directed against the original top surface of the plate with the top surface adjacent the jet at ignition temperature, and directed at an acute angle that slopes downward toward the edge face, and along a plane that intersects the surface of the groove at the downstream end of the kerf.

2. The method of shaping the edge of a metal work-piece comprising heating metal of the edge face to a surface ignition temperature, passing an oxygen scarfing jet along the heated metal of the edge face to produce a groove, and then cutting off the upper corner portion of the work-piece by moving an oxygen cutting jet along the original top surface of the work-piece with the top surface adjacent said oxygen cutting torch at ignition temperature, and with the cutting jet directed against the top surface back from the edge face and in a plane that intersects the groove.

3. The flame machining method comprising scarfing a longitudinal groove in a side edge face of a metal work-piece, and removing metal above the groove in solid condition by means of a cutting jet operating against the top face and in a plane back of said side edge face and intersecting the wall of the groove at the downstream end of the kerf.

4. In the flame machining of an edge of a metal work-piece to shape said edge for welding, the improvement which comprises scarfing a groove in the edge face of the work-piece a short distance above the bottom of the work-piece, and cutting off the upper corner of the work-piece above the groove by directing a cutting jet against the original top surface of the work-piece with the top surface adjacent the jet at ignition temperature and directing the cutting jet against said top surface at a distance back of the edge and in a direction to cut a kerf that intersects the groove.

5. The method of flame machining a metal plate edge to a contour for welding, which method comprises scarfing a groove, of segmental cross-section, along the length of the edge and a short distance above the bottom of the plate, and cutting off the upper corner portion of the plate as a solid piece by moving a cutting jet along the original top surface of the plate with the top surface adjacent the jet at ignition temperature and with the jet disposed to cut along a plane that is substantially tangent to the curved surface of the groove.

6. The flame machining process comprising moving an oxygen jet progressively along the edge surface of a metal work-piece and by said oxygen jet scarfing a groove, and simultaneously moving a cutting jet along the original top surface of the work-piece some distance behind the scarfing jet with said top surface adjacent the jet at ignition temperature, and by said cutting jet severing from the plate a solid portion of the metal above the groove.

7. The flame machining method comprising grooving a side edge surface of a metal work-piece by directing an oxygen cutting torch against metal at ignition temperature, and then cutting with an oxygen jet directed against the original top surface of the work-piece with said surface in the region of the jet at ignition temperature and with the jet disposed to cut through solid metal with a kerf that intersects the groove at the downstream end of the kerf.

8. In flame machining the edge of a metal work-piece, the method comprising scarfing a groove in the edge face of the work-piece by means of an oxygen jet that produces a groove with an arcuate surface, and then cutting through the solid metal above the groove with an oxygen cutting jet directed against surface metal at ignition temperature and disposed to cut a kerf, the plane of which is substantially tangent to the arcuate surface of the groove, but slightly inside of the true tangent position.

9. The method of forming a bevel edge on a metal work-piece preparatory to welding, which method comprises moving an oxygen scarfing jet progressively along the edge face of the work-piece with the jet located above the level of the bottom of the work-piece and directed against metal at ignition temperature and directed at such an angle to the edge face that the scarfing jet produces a straight groove of substantially semi-circular cross-section, said groove being located above the bottom of the edge face so as to leave an unscarfed land below the groove, and producing a beveled face, above the groove and substantially tangent with the surface of the groove, by directing an oxygen cutting jet against the original top surface of the work-piece with the top surface adjacent the jet at ignition temperature and directing the cutting jet against said top surface some distance back from the edge of the work-piece, disposing the oxygen jet at such an angle to the top surface that said oxygen jet slopes downward and outward in a plane substantially tangent to the surface of the groove but intersecting the groove surface, and moving the oxygen cutting jet progressively along the work-piece close behind the scarfing jet so that the cutting oxygen jet acts upon metal that is still warm from the scarfing operation.

10. The method of flame machining an edge of a metal work-piece, which method comprises scarfing two spaced longitudinal grooves in an upwardly extending edge face of the work-piece, directing an oxygen cutting jet against the original top face of the work-piece with the top surface adjacent the jet at ignition temperature and directing the cutting jet against said top surface in a plane that intersects the upper of said grooves to sever the upper edge portion from the work-piece, and directing a similar cutting jet against the bottom face of the work-piece in a direction that intersects the other of the longitudinal grooves in the edge face to sever the lower edge portion from the work-piece.

11. The flame machining process which comprises scarfing two parallel grooves in an edge face of a metal work-piece with a strip of the original edge face between said grooves, removing as solid metal the edge portion of the work-piece above the upper of said grooves by directing a progressively-moving oxygen cutting jet against the original top surface of the work-piece with the top surface adjacent the jet at ignition temperature and directing the cutting jet against said top surface at some distance back of the edge face and in a plane that intersects the upper groove, and similarly removing the edge portion of the work-piece below the lower of said grooves by a progressively moving cutting jet directed against the original bottom face of the work-piece, at some distance back of the edge face and in a plane that intersects the lower groove.

12. The process of flame machining comprising simultaneously directing two scarfing jets against the edge face of a metal work-piece with the surface metal of the edge face at ignition temperature in the regions of the jets, while causing relative longitudinal movement between the work-piece and the scarfing jets, and producing with said scarfing jets two parallel grooves of substantially semi-circular cross-section with a strip of the original surface of the edge face between said grooves, and following closely behind the scarfing jets with separate oxygen cutting jets directed against the original top and bottom surfaces of the work-piece with said top and bottom surfaces at ignition temperature in the regions of the oxygen jets, and directing said jets against the top and bottom surfaces of the work-piece at a distance back from the edge face of the work-piece and along planes substantially tangent to the curved surfaces of the upper and lower grooves, respectively, of said parallel grooves.

HOWARD G. HUGHEY.
WALTER G. SYLVESTER.